March 23, 1943.　　A. L. PARKER　　2,314,512
VALVE ASSEMBLY FOR FUEL SYSTEMS
Filed March 17, 1941　　2 Sheets-Sheet 1
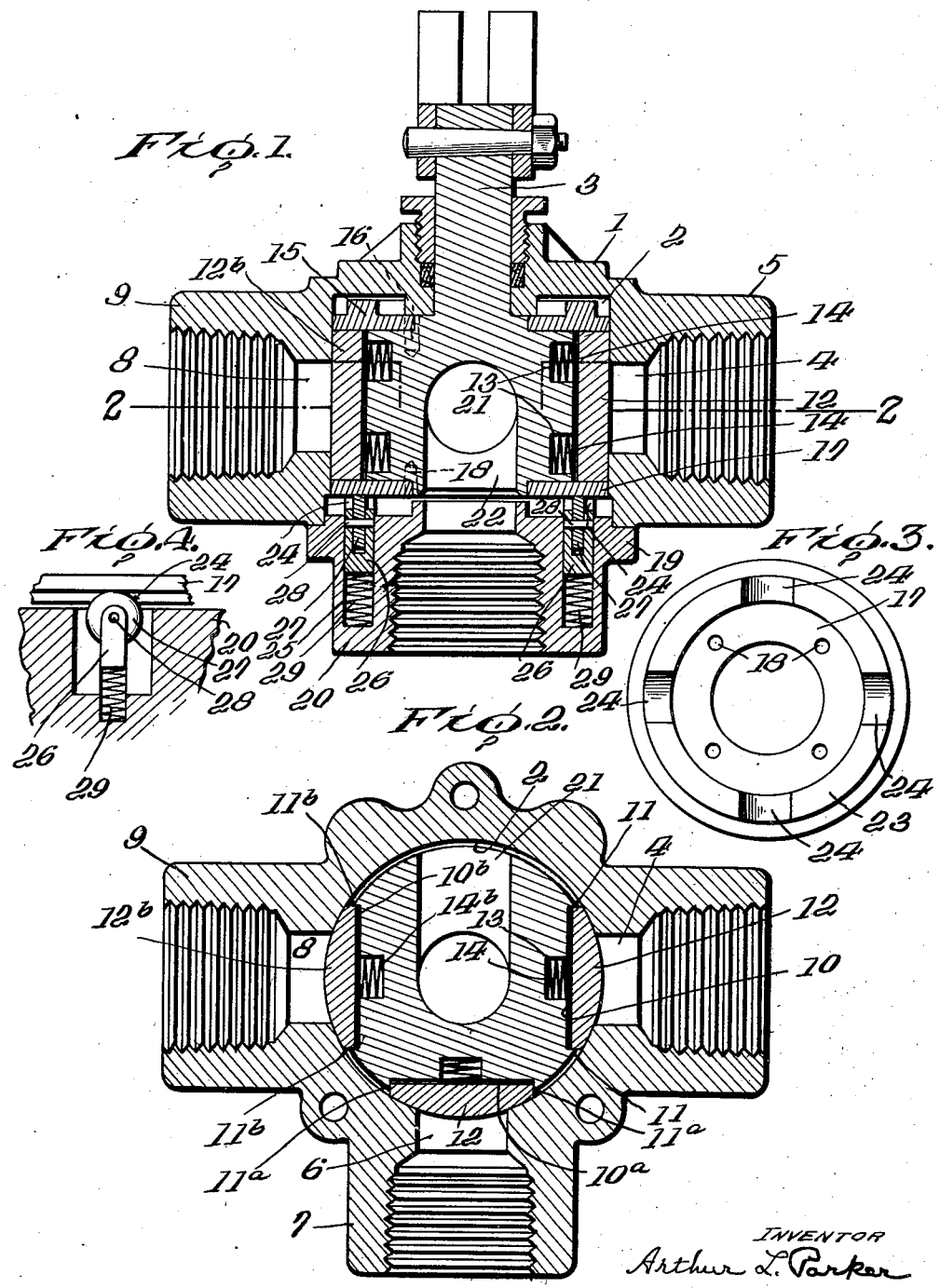
INVENTOR
Arthur L. Parker
By
Mason & Porter
ATTORNEYS

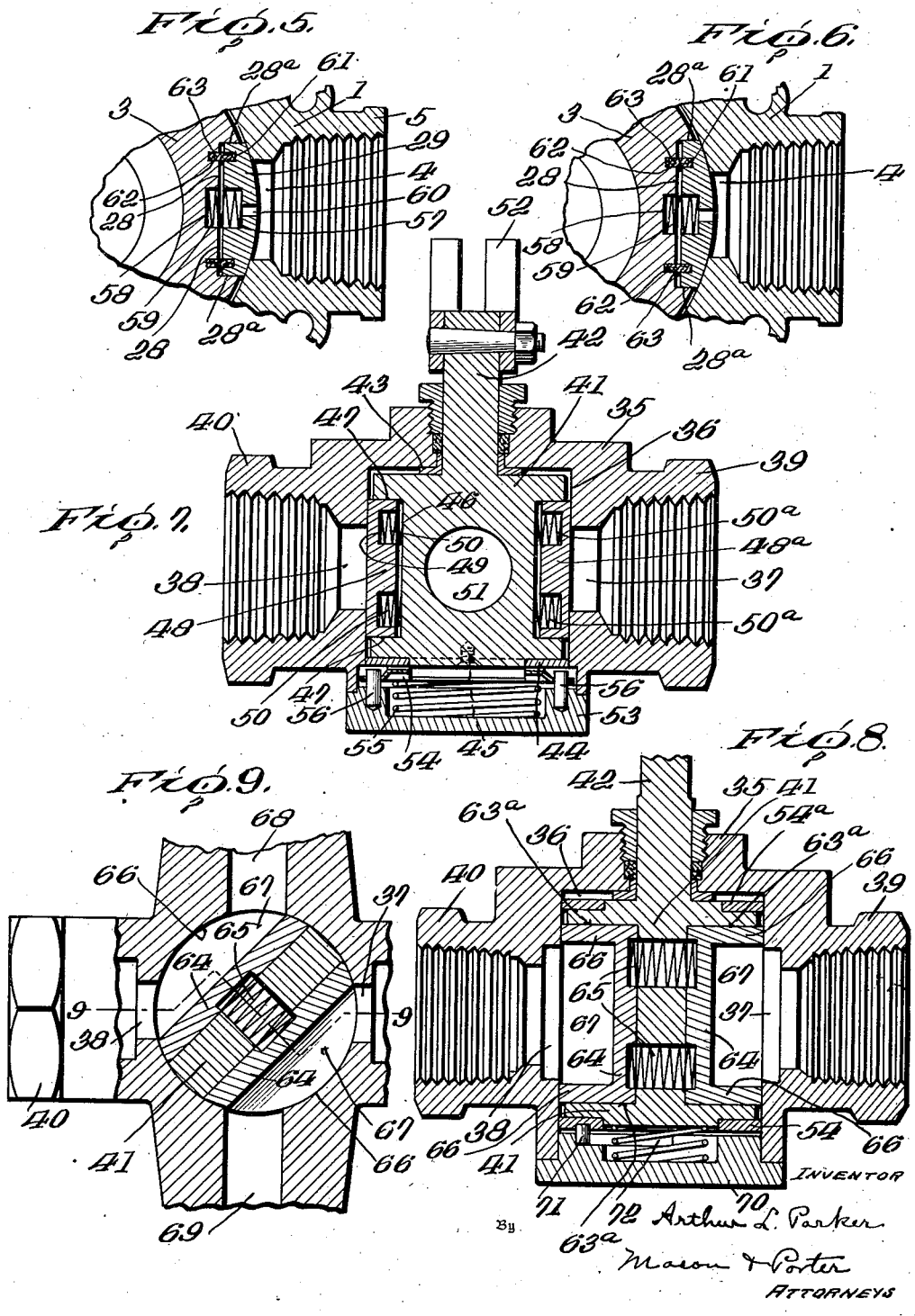

Patented Mar. 23, 1943

2,314,512

UNITED STATES PATENT OFFICE 2,314,512

VALVE ASSEMBLY FOR FUEL SYSTEMS

Arthur L. Parker, Cleveland, Ohio

Application March 17, 1941, Serial No. 383,825

4 Claims. (Cl. 251—102)

The invention relates to new and useful improvements in a valve assembly for a fuel system which is especially adapted for use in aircraft construction.

An object of the invention is to provide a valve assembly for aircraft fuel systems which is light in weight, which has good flow characteristics, a low turning torque, and reliability against leakage.

In the drawings—

Figure 1 is a sectional view through a valve assembly embodying the improvements;

Fig. 2 is a view in section of the valve assembly on the line 2—2 of Figure 1;

Fig. 3 is a plan view of the positioning ring mounted on and movable with the valve actuating member;

Fig. 4 is a detail partly in section showing the roller holding the valve in a set position;

Fig. 5 is a sectional view showing a slightly modified form of means for closing the ports;

Fig. 6 is a view similar to Figure 5 showing a still further modified form of construction for closing the ports;

Fig. 7 is a longitudinal sectional view through the valve assembly of a still further modified form of the invention;

Fig. 8 is a longitudinal sectional view through another modified form of valve assembly, and Fig. 9 is a view partly in section and partly in plan of the valve assembly shown in Figure 8.

The improved valve assembly includes a valve casing having a cylindrical chamber therein, with one or more ports leading from the chamber through the cylindrical wall thereof. Within this cylindrical chamber is a valve operating member which is also generally of cylindrical shape. Means is provided for mounting the valve operating member in the valve casing so that it turns about an axis coincident with the longitudinal axis of the cylindrical chamber. The valve operating member is dimensioned so that it is free from contact with the cylindrical wall of the valve casing. Mounted on the valve operating member are wear plates or disks which make contact with the cylindrical wall for guiding said valve operating member in its turning movements. The valve operating member is provided with recesses, and the centers of these recesses are spaced from each other circumferentially of the valve operating member, the same as the centers of the ports in the cylindrical wall of the chamber. Each recess has spaced parallel walls. In each recess is a valve insert which is guided by these spaced parallel walls so that it will not cock or jam in its movements. Means is provided for pressing this valve insert outwardly into contact with the cylindrical wall. This means may be in the form of springs, or in the form of fluid-pressure means, or both.

It is believed that the invention will be better understood by a detail description of the structures shown in the drawings which illustrate three different embodiments of the invention. Figures 1 to 6, inclusive, show the invention applied to a valve assembly which is adapted for connecting various sources of fuel supply to a line leading to the fuel supply system. The valve assembly includes a valve casing 1 which is provided with a main cylindrical chamber 2 in which the valve operating member 3 is mounted. This valve casing has a port 4 in the cylindrical wall and an extension 5 associated therewith to which a pipe may be connected in any suitable way. In the illustrated embodiment in these figures, there is also a port 6 with which is associated an extension 7 for connection to a pipe, and a port 8 with which there is likewise associated an extension 9. The valve casing is closed at its upper end, except for an opening through which the stem of the valve operating member 3 extends. Any suitable turning means may be attached to this stem. Suitable means is provided for guiding and packing the valve stem in the valve casing. The valve operating member is milled lengthwise thereof to provide a recess 10. The recess has parallel walls 11, 11. In this recess is mounted a valve 12 which is guided by the parallel walls 11, so that the valve may move freely without cocking in a direction outward from the center of the valve operating member. The outer face of this valve 12 is curved to conform to the curvature of the cylindrical wall of the chamber 2. There are recesses 13, 13 in the valve operating member in which are located springs 14, and these springs force the valve outwardly into contact with the valve casing. This valve 12 extends from the upper side of the body portion of the valve operating member 3 to the lower side thereof, and is dimensioned so that when the valve is turned to bring the valve centers over the port 4, it will completely overlie the port all the way around and close the port. There is a similar recess 10a in the valve operating member in which is located a valve 12a. This recess has parallel walls 11a, 11a for guiding the valve 12a and springs 14a normally press the valve outwardly into contact with the valve casing. This valve is so disposed on the valve operating member that when the valve 12 is centered relative to the port 4, then the valve 12a is centered relative to the port 6.

The valve operating member 3 is further provided with a recess 10b having parallel walls 11b, 11b, and in the recess is located a valve 12b. Springs 14b normally press the valve 12b outward into contact with the cylindrical wall of the valve casing.

At the upper side of the body of the valve operating member 3 is a wear plate or disk 15 which is secured to the valve operating member by suitable screws, one of which is indicated at 16. This wear plate has a reinforcing annular rib on its upper face. The wear plate is dimensioned so that it makes smooth running contact with the cylindrical wall of the valve casing, and thus serves to guide and center the valve operating member in the valve casing. This wear plate also closes the upper ends of the recesses in which the valves are inserted, and serves as a guiding member for the valves. Attached to the lower end of the body of the valve operating member is a wear plate 17 which is secured to the valve operating member by screws, one of which is indicated at 18. This wear plate closes the lower ends of the recesses for the valves and serves as a guide for the valves. It is also dimensioned so as to make contact with the cylindrical wall of the valve casing closed by a plate 19. This plate has an extension and serve as another means for centering and guiding the valve operating member in its rotating movement.

The lower end of the cylindrical chamber 2 is sion 20 with which a pipe may be connected by any suitable means. The valve operating member 3 has a radial port 21 which connects with a longitudinally arranged port 22, and this port 22 is in continuous connection with the pipe attached to the extension 20. This port 21 is so disposed that it may be moved into alignment with the port 4, at which time the valves will be in alignment with and close ports 6 and 8. The valve operating member may be turned so as to position this port 21 selectively in alignment with any one of the three ports 4, 6 or 8, and the other two ports will be closed. When the valve operating member is positioned as shown in Figure 2, then all of the ports will be closed. The valve lends itself to a very efficient means for connecting a series of fuel tanks with the fuel supply system of an airplane. By turning the valve it may be either closed or connected to any one of three tanks which are respectively connected to the extensions 5, 7 and 9 associated with the ports 4, 6 and 8.

As shown in Figure 3, the wear plate 17 which is fixed to the valve operating member 3 and turns therewith, is provided with an annular rib 23, which rib has formed therein a series of semi-cylindrical recesses 24. There are four of these recesses. The center lines of these recesses are 90° apart, which is the same angular distance as the spacing of the centers of the ports in the valve casing. The extension 20 is provided with two diametrically arranged recesses 25. The opposite walls of each recess have curved cutaways to receive and guide a pin 26. This pin is slotted and mounted in the slotted pin is a roller 27 supported by a pivot pin 28. This roller is free to turn in the slotted pin. A spring 29 located beneath the pin presses the pin upwardly and the roller 27 into contact with the annular rib 23. There are two of these spring-pressed rollers 27 and they are arranged diametrically opposite each other. The pin supporting the roller is kept from turning by reason of the fact that the recess, except where cut away and curved to fit the pin, is of substantially the same width as the width of the roller.

These semi-cylindrical recesses 24, 24 are so positioned relative to the valves and the port 21, that when the valves are centered relative to the ports in the valve casing, the rollers will engage the recesses and thus yieldingly hold the valve in this set position. When pressure is applied for turning the valve to another set position, the rollers will yield and permit the valve to be turned. This makes a very accurate means for centering the port 21 relative to any one of the selected ports 4, 6 or 8, and also an accurate means for centering the valves relative to all three ports when it is desired to close the same.

In Figure 5 there is shown a slightly modified form of means for forcing the valve insert into engagement with the valve casing. Many of the parts are similar in construction to those described above in connection with Figures 1 and 2. The valve casing 1 is provided with an extension 5 with which is associated a port 4. This extension 5 is connected to a pipe leading to a supply tank as described above. Located in the cylindrical chamber of the casing 1 is a valve operating member 3 which is provided with a recess 28 having parallel spaced walls 28a. Located in this recess is the valve insert 29 which makes contact with these spaced walls and is guided thereby. There is a recess 57 in the valve insert 29 and a recess in the valve operating member. A spring 59 is placed in this recess and operates to force the valve insert outward into contact with the cylindrical wall. There is a port 60 which leads through the insert from the outer face thereof to the recess 57. The valve insert 29 is also provided with an annular recess 61 and the valve operating member is provided with a similar annular recess 62. In these recesses 61 and 62 is a ring gasket 63 which serves as a seal. The inner face of the gasket is substantially in alignment with the wall of the port 4. When the valve insert is in the position shown in Figure 5, and there is fluid pressure on the line to which this extension 5 is connected, the fluid passing through into the recesses 57 and 58 will balance partially the pressure against the valve insert. The spring may be adjusted so as to bring about a very nice balancing of the fluid pressure and a firm seating of the valve insert against the wall of the cylindrical chamber.

In Figure 6 there is shown a slightly modified form of the invention in that the gasket 63 is so placed that the surface exposed to fluid pressure at the inside of the insert is greater than the are of the port 4, and therefore, the valve insert will be maintained seated by fluid pressure when said valve insert is brought to a position for closing the port. This would occur only when there is fluid pressure on the line sufficient to bring about a seating of the valve insert. Even though the valve insert is seated by fluid pressure, it is preferable to use a very light spring so as to hold the valves in light contact with the wall of the cylindrical chamber when said valve insert is not used for closing a port.

In Figure 7 there is shown a slightly modified form of valve assembly. The valve casing 35 has a cylindrical chamber 36 with ports 37 and 38 arranged diametrically opposite each other in the cylindrical surface of the chamber 36. Associated with the port 37 is an extension 39 to which a pipe may be connected. Located within the chamber 36 is a valve operating member 41 having a valve stem 42. Between the valve casing and the valve stem is a bearing plate 43. Attached to the lower end of the valve operating member 41 is a bearing plate 44 which is secured thereto by screws, one of which is illustrated at 45. This bearing plate 44 is in the form of a disk and is so machined as to make contact with the wall of the cylindrical chamber 36. The valve operating member is dimensioned so as to be out of contact with the wall of the chamber. This valve operating member 41 is machined so as to provide a recess 46 having spaced parallel walls 47, 47. Located in this recess is a valve insert 48, which likewise has spaced walls contacting with and guided by the spaced walls 47. This provides a means for preventing the valve insert in its movements from twisting or cocking. The outer face of the valve insert is cylindrical and is curved about the same center as the cylindrical surface of the chamber 36. The valve insert is provided with recesses 49, 49 in each of which is a spring 50. The springs 50 normally force the insert outward into contact with the wall of the cylinder, and this insert is of sufficient dimensions so as to completely cover the port 38 when brought into centered relation thereto. There is a similar insert 48a cooperating with the port 37, and this insert 48a is shaped to conform to the wall of the cylindrical chamber 36 and is forced outward into contact therewith by springs 50a, 50a.

Extending diametrically through the valve operating member 41 is a port 51. This port 51 is of substantially the same diameter as the ports 37 and 38. The valve operating member, as shown in Figure 7, is positioned so that the valve inserts are closing the ports 37 and 38. If this valve operating member be turned through an angle of 90°, then the port 51 will be brought into alignment with the ports 37 and 38, and the fluid can flow freely through the valve operating member from one port to the other.

The valve stem 42 is provided with a suitable operating means 52. The lower end of the valve casing 35, as shown in Figure 7, is closed by a plate 53 which is secured by suitable bolts to the casing.

While the same means as described above for holding the valve operating member in set positions may be used in connection with this valve assembly, there is a slightly different means shown which will be described briefly. The valve casing is closed by a plate 53 which is secured to the valve casing by suitable bolts. The wear plate 44 is provided with an annular rib having V-shaped recesses. Mounted in the valve casing chamber below the wear plate is a holding disk 54 which has V-shaped ribs adapted to engage these V-shaped recesses in a manner similar to the rollers passing into the recesses 27 as described above. This holding disk 54 is yieldingly urged toward the wear plate 44 by the spring 55 and the holding disk is prevented from turning by means of pins 56, 56. The plate functions precisely as the rollers and will hold the valve in a set position with the port therethrough joining the two ports 37 and 38, or with the valve inserts centered relative to the ports 37 and 38 and closing the same.

In Figures 8 and 9, the invention is shown as applied to a fluid control in a reversing valve. Many of the parts are similar to those which have been described in connection with Figure 7. There is a valve casing 35 having a cylindrical valve chamber 36, and this cylindrical chamber has ports 37 and 38 formed in the cylindrical surface thereof. The port 37 leads to an extension 39 and the port 38 to an extension 40. Within the chamber 36 is a valve operating member 41 provided with a stem 42 to which a suitable operating means is connected. This valve operating member is dimensioned so that it does does not make contact with the inner surface of the chamber 36. There is a wear plate 54 at the lower end of the valve operating member and there is a wear plate 54a at the upper end of the valve operating member. These wear plates are disk-shaped and are secured to the valve operating member. They are machined so as to make free running contact with the wall of the cylinder. This guides the valve operating member so that it will rotate about an axis coincident with the axis of the cylindrical chamber 36. The valve operating member is provided with recesses 63a, 63a in which are mounted valve inserts 64, 64 which are similar in construction. The valve ports 37 and 38 are rectangular in shape.

The recesses in the valve operating member 41 extend angularly a slight distance beyond the ports 38 and 68 on one side of the valve operating member and a slight distance beyond the ports 37 and 69 on the other side of the valve operating member. Located in these recesses are valve inserts 64. There are recesses in the valve operating member 41 in which there are located springs 65, and these springs 65 normally press the valve inserts outwardly away from the center of the valve operating member. Each valve insert has segmental projecting portions 66 which are curved to conform to the curved surface of the cylindrical chamber. These segmental projections, as shown in Figure 8, are located so as to contact respectively with the wall of the valve casing above and below the ports. As clearly shown in Figure 9, each valve insert also contacts with the wall of the valve casing alongside of the ports which are being controlled. Between the projecting portions is a cutaway 67 forming a port in the valve insert which will connect two of the ports in the valve casing. This contact with the valve casing above and below the ports and alongside of the ports prevents any fluid from crossing from one side of the valve operating member to the other side thereof. In other words, when the valve operating member is positioned as shown in Figure 9, the port 38 will be connected with the port 68, and likewise the port 37 will be connected with the port 69.

When the valve is turned through an arc of 90°, then the port 37 will be connected with the port 68 and the port 38 will be connected with the port 69. These valve inserts are the only parts of the valve operating member which contact with the wall of the valve casing, and this insures a free movement of the valve and also a tight connection between the opposite sides of the valve, so that the fluid even under pressure will flow freely along one side of the reversing valve and likewise freely along the other side of the reversing valve in the opposite direction.

The lower end of the valve casing is closed by a plate 70. The bearing plate 54, as shown, carries a pin 71 which extends into an arc-shaped recess 72 and may be brought into contact with one end or the other of the recess and serve as a stop for limiting the movement of the reversing valve. When the pin is at one end of the slot, then the valve will be positioned as shown in Figure 8, and when at the other end of the slot, it will be turned through an arc of 90° and thus positioned for connecting the port 37 to the port 68, and the port 38 to the port 69.

The essential novel features of this reversing valve are the cylindrical chamber in the valve casing, the operating member within the chamber which does not make contact therewith, the wear plates associated therewith making contact with the chamber wall, and the spring-pressed inserts which regulate the flow of fluid through the valve chamber.

It is obvious that many changes may be made in the details of construction without departing from the spirit of the invention as set forth in the appended claims.

Having thus described the invention, what I claim as new and desire to secure by Letters Patent, is:

1. A valve assembly comprising a valve casing having a substantially cylindrical chamber with at least one port leading through the wall, a valve operating member in said chamber mounted for rotation about an axis coincident with the axis of the chamber, said valve operating member being dimensioned so as to be free from contact with the wall of the chamber, wear plates disposed at the upper and lower ends of the valve operating member and contacting with the valve casing, said valve operating member having a recess formed therein, a valve in said recess disposed so as to cover the port in the cylindrical wall and means for holding the valve in engagement with the cylindrical wall.

2. A valve assembly comprising a valve casing having a substantially cylindrical chamber with at least one port leading through the wall, a valve operating member in said chamber mounted for rotation about an axis coincident with the axis of the chamber, said valve operating member being dimensioned so as to be free from contact with the wall of the chamber, wear plates disposed at the upper and lower ends of the valve operating member and contacting with the valve casing, said valve operating member having a recess formed therein, a valve in said recess disposed so as to cover the port in the cylindrical wall and means for holding the valve in engagement with the cylindrical wall, said recess having parallel walls extending from end to end of the valve operating member and said wear plates being disposed so as to overlie and close the ends of the recess.

3. A valve assembly comprising a valve casing having a cylindrical chamber therein with a plurality of spaced radial ports leading from the chamber through the wall, a valve operating member having a port extending radially thereof and adapted to be brought selectively into alignment with the ports of the casing, said valve operating member having recesses formed therein, a valve mounted in each recess, said valves being disposed so as to cover and close the ports when the valve operating member is in closed position, and to cover the ports, except the one in alignment with the radial port in the valve operating member when said valve operating member is in open position, said valve operating member being dimensioned so as to be substantially free from contact with the wall of the chamber, wear plates disposed at the ends of the valve operating member and making edge contact with the valve casing for guiding the valve operating member and means for forcing the valves outwardly on the valve operating member into engagement with the cylindrical wall of the chamber.

4. A valve assembly comprising a valve casing having a cylindrical chamber therein with a plurality of spaced radial ports leading from the chamber through the wall, a valve operating member having a port extending radially thereof and adapted to be brought selectively into alignment with the ports of the casing, said valve operating member having recesses formed therein, a valve mounted in each recess, said valves being disposed so as to cover and close the ports when the valve operating member is in closed position, and to cover the ports, except the one in alignment with the radial port in the valve operating member, when said valve operating member is in open position, said valve operating member being dimensioned so as to be substantially free from contact with the wall of the chamber, wear plates disposed at the ends of the valve operating member and making edge contact with the valve casing for guiding the valve operating member and means for forcing the valves outwardly on the valve operating member into engagement with the cylindrical wall of the chamber, each of said recesses having spaced parallel walls extending from end to end of the valve operating member and said wear plates being disposed so as to cover the ends of said recesses.

ARTHUR L. PARKER.